(12) United States Patent
Bansal (10) Patent No.: US 7,304,988 B2
(45) Date of Patent: Dec. 4, 2007

(54) TECHNIQUE FOR BUILDING A LARGE SINGLE-STAGE CROSS-CONNECT USING MULTIPLE DEVICES WITHOUT INTERLEAVING

(75) Inventor: Narendra K. Bansal, Londonderry, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 1005 days.

(21) Appl. No.: 10/402,916

(22) Filed: Mar. 28, 2003

(65) Prior Publication Data

US 2004/0190504 A1  Sep. 30, 2004

(51) Int. Cl.
*H04L 12/52* (2006.01)
*H04Q 11/04* (2006.01)
(52) U.S. Cl. ...................... 370/369; 370/388
(58) Field of Classification Search ................ 370/369, 370/375, 387, 388
See application file for complete search history.

(56) References Cited

U.S. PATENT DOCUMENTS

| | | | |
|---|---|---|---|
| 5,982,746 A * | 11/1999 | Hanson et al. ............. 370/220 |
| 6,366,713 B1 | 4/2002 | Lin et al. ...................... 385/16 |
| 6,798,784 B2 * | 9/2004 | Dove et al. ................. 370/463 |
| 6,816,487 B1 * | 11/2004 | Roberts et al. ............. 370/388 |
| 6,870,838 B2 * | 3/2005 | Dally ........................ 370/388 |
| 7,123,612 B2 * | 10/2006 | Lu ............................. 370/388 |
| 7,161,906 B2 * | 1/2007 | Dell et al. .................. 370/388 |
| 7,212,523 B2 * | 5/2007 | Bansal ....................... 370/369 |
| 2004/0001454 A1 * | 1/2004 | Boily ........................ 370/314 |

* cited by examiner

*Primary Examiner*—Wing Chan
*Assistant Examiner*—Greg Sefcheck
(74) *Attorney, Agent, or Firm*—Weingarten, Schurgin, Gagnebin & Lebovici LLP (57) ABSTRACT

A digital cross-connect switching system that has a single-stage architecture, a scalable bandwidth, and reduced connection memory storage requirements. The scalable bandwidth digital cross-connect switching system includes a plurality of digital cross-connect building blocks. Each digital cross-connect building block includes at least one cross-connect having a plurality of input ports and a plurality of output ports, at least one connection memory communicatively coupled to the cross-connect, and at least one OR gate. Bandwidth is scaled in the digital cross-connect switching system by interconnecting predetermined numbers of the digital cross-connect building blocks. In general, the size of the digital cross-connect switching system increases as the square of the bandwidth requirement.

9 Claims, 8 Drawing Sheets

TECHNIQUE FOR BUILDING A LARGE SINGLE-STAGE CROSS-CONNECT USING MULTIPLE DEVICES WITHOUT INTERLEAVING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to digital communications systems, and more specifically to an architecture of a scalable bandwidth single-stage digital cross-connect switching system.

Digital communications systems are known that employ digital cross-connect switching systems for cross-connection of high speed optical or electrical signals in broadband communications networks. An architecture of a conventional digital cross-connect switching system includes a plurality of input ports, a plurality of output ports, a cross-connect such as a Time Division Multiplex (TDM) cross-connect, and at least one connection memory. The TDM cross-connect is typically configured to connect any input port with any one or more of the output ports based on connection information stored in the connection memory. For example, high speed optical or electrical signals received by the TDM cross-connect may comprise a plurality of data frames contained in a number of respective time slots. Further, the TDM cross-connect may temporarily store the data received at one of the input ports during a first time slot, and may subsequently retransmit that data during a second time slot, which is assigned to at least one of the output ports. The TDM cross-connect accesses the connection information pertaining to the respective time slot/output port assignments from the connection memory.

Various techniques are known for increasing the bandwidth of conventional digital cross-connect switching systems. For example, the TDM cross-connect may be employed in a Synchronous Optical NETwork (SONET) multiplexed communications system. According to the SONET standard, high speed optical or electrical signals are generally formatted in Synchronous Transport Signal (STS) frames. A basic STS-1 frame comprises nine rows of data bytes by ninety columns of data bytes, in which the first three columns contain Transport OverHead (TOH) bytes and the remaining eighty-seven columns contain Synchronous Payload Envelope (SPE) bytes. In order to increase the bandwidth of the TDM cross-connect in the SONET communication system, M (M>1) STS-1 tributaries may be multiplexed together to form a single STS-M frame by interleaving the STS-1 tributaries one byte at a time ("byte interleaving"). Alternatively, the bandwidth of the TDM cross-connect may be increased by interleaving the STS-1 tributaries one bit at a time ("bit interleaving") or one column at a time ("column interleaving").

However, such conventional techniques for increasing the bandwidth of digital cross-connect switching systems have drawbacks. For example, the first row of a typical STS-1 frame includes TOH bytes A1 and A2, which form a framing pattern of bits indicative of the start of the frame. When performing byte, bit, or column interleaving on STS-1 tributaries, these framing bits are frequently lost, thereby requiring the cross-connect switching system to generate new framing bits for the interleaved data. Further, the bit interleaving technique normally cannot increase the bandwidth of the TDM cross-connect by more than a factor of 8. Moreover, an increased amount of connection information is typically needed for properly routing the interleaved bits/bytes/columns of data to the desired output port(s), thereby requiring use of a significantly larger connection memory.

It would therefore be desirable to have an architecture of a digital cross-connect switching system that has a scalable bandwidth. Such a cross-connect switching system would employ a connection memory that is smaller than that used in conventional high bandwidth cross-connect switching systems. It would also be desirable to have a scalable bandwidth digital cross-connect switching system that has a single-stage architecture.

BRIEF SUMMARY OF THE INVENTION

In accordance with the present invention, a digital cross-connect switching system is provided that has a single-stage architecture, a scalable bandwidth, and reduced connection memory storage requirements. Benefits of the presently disclosed digital cross-connect switching system are achieved by providing a Time Division Multiplexing (TDM) cross-connect building block, a plurality of which may be connected together to form the scalable bandwidth digital cross-connect switching system.

In one embodiment, the scalable bandwidth digital cross-connect switching system includes a plurality of TDM cross-connect building blocks. Each TDM cross-connect building block includes at least one TDM cross-connect having a plurality of input ports and a plurality of output ports, at least one connection memory communicatively coupled to the TDM cross-connect, and at least one OR gate. The TDM cross-connect building block is configured to receive first input data at a first data rate, and switched input data at a second data rate. The TDM cross-connect building block is further configured to provide first output data at the first data rate, and second switched output data at the second data rate. In the preferred embodiment, the second data rate is equal to the first data rate. Further, the data contained in the first output data matches the data contained in the first input data. The TDM cross-connect is configured to receive the first input data at one or more of the input ports, and to provide first switched output data at one or more of the output ports based on connection information stored in the connection memory. The OR gate is configured to receive the switched input data and the first switched output data generated by the TDM cross-connect, and to generate the second switched output data.

In another embodiment, the TDM cross-connect building block is configured to receive first input data at a first data rate, second input data at the first data rate, first switched input data at a second data rate, and second switched input data at the second data rate. The TDM cross-connect building block is further configured to provide first output data at the first data rate, second output data at the first data rate, third switched output data at the second data rate, and fourth switched output data at the second data rate. In the preferred embodiment, the second data rate is equal to the first data rate. Further, the data contained in the first output data matches the data contained in the first input data, and the data contained in the second output data matches the data contained in the second input data. The TDM cross-connect is configured to receive the first input data and the second input data at one or more of the input ports, and to provide first switched output data and second switched output data at one or more of the output ports based on connection information stored in the connection memory. A first OR gate is configured to receive the first switched input data and the first switched output data generated by the TDM cross-connect, and to generate the third switched output data. A second OR gate is configured to receive the second switched input data and the second switched output data generated by the TDM cross-connect, and to generate the fourth switched output data.

In the presently disclosed embodiment, bandwidth is scaled in the TDM cross-connect switching system by interconnecting predetermined numbers of the TDM cross-connect building blocks. Four TDM cross-connect building blocks are operatively interconnected to double the bandwidth of the TDM cross-connect switching system. Nine TDM cross-connect building blocks are operatively interconnected to triple the bandwidth of the TDM cross-connect switching system. In general, the size of the TDM cross-connect switching system increases as the square of the bandwidth requirement.

By providing a TDM cross-connect building block, and operatively interconnecting predetermined numbers of the TDM cross-connect building blocks, a TDM cross-connect switching system can be formed that has a single-stage architecture, a scalable bandwidth, and reduced connection memory storage requirements.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

An architecture of a digital cross-connect switching system is disclosed that has a single-stage architecture, a scalable bandwidth, and reduced connection memory storage requirements. The presently disclosed digital cross-connect switching system achieves such benefits by providing a Time Division Multiplexing (TDM) cross-connect building block, a plurality of which can be operatively interconnected to suit the cross-connection requirements of the overall communications system.

Figure 1:
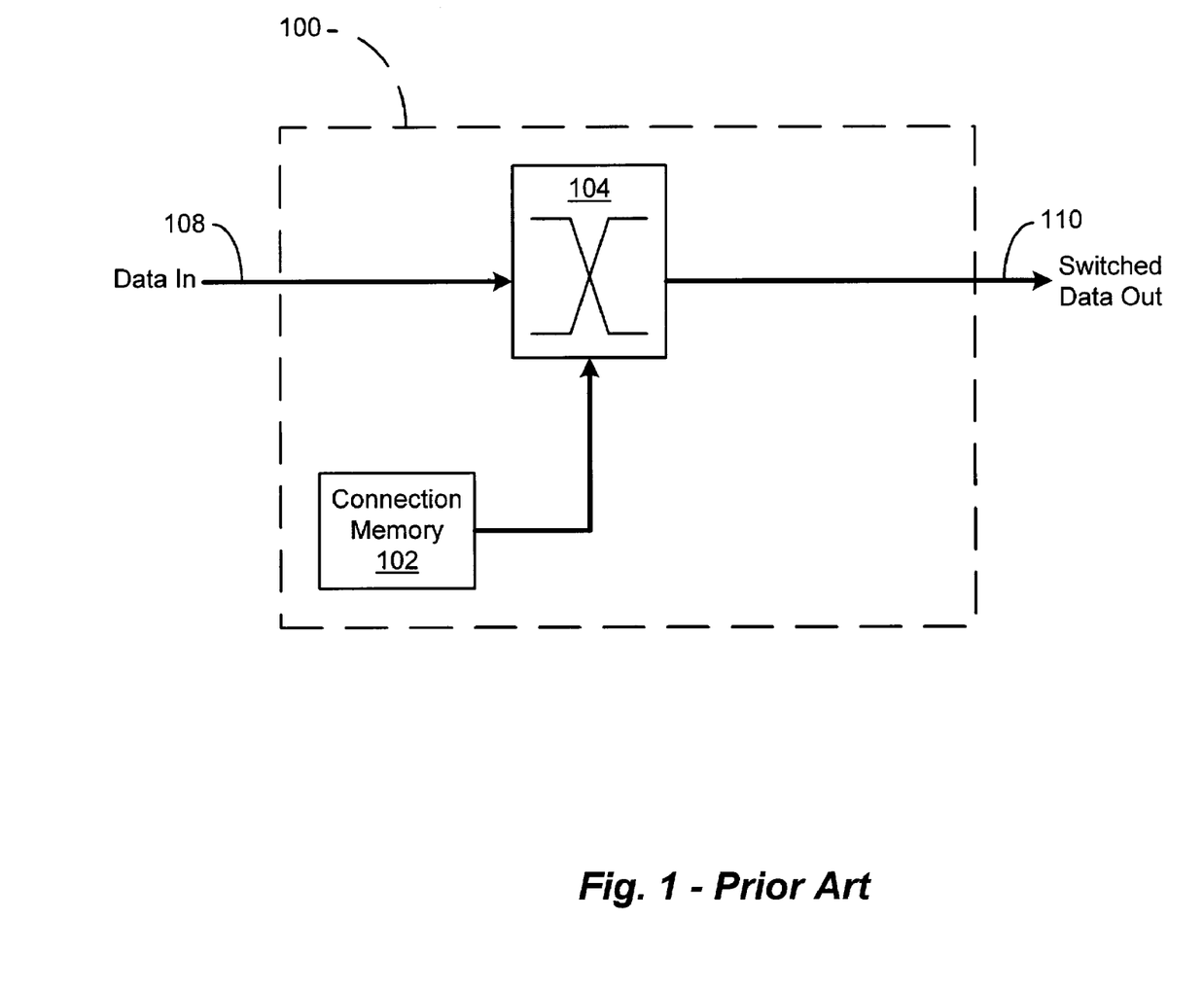
FIG. 1 is a block diagram of a conventional digital cross-connect switching system.

FIG. 1 depicts an illustrative embodiment of a conventional TDM cross-connect switching system 100. In the illustrated embodiment, the cross-connect switching system 100 includes an input bus 108, an output bus 110, a cross-connect 104 such as a TDM cross-connect, and a connection memory 102. The TDM cross-connect 104 is configured to receive optical and/or electrical input signals, e.g., data frames, from the input bus 108 at one or more of a plurality of input ports (not shown), and to provide the data to one or more of a plurality of output ports (not shown) based on connection information stored in the connection memory 102. The TDM cross-connect 104 provides the data at the output ports to the output bus 110 as switched output data for subsequent transmission through the digital communications system.

Figure 2:
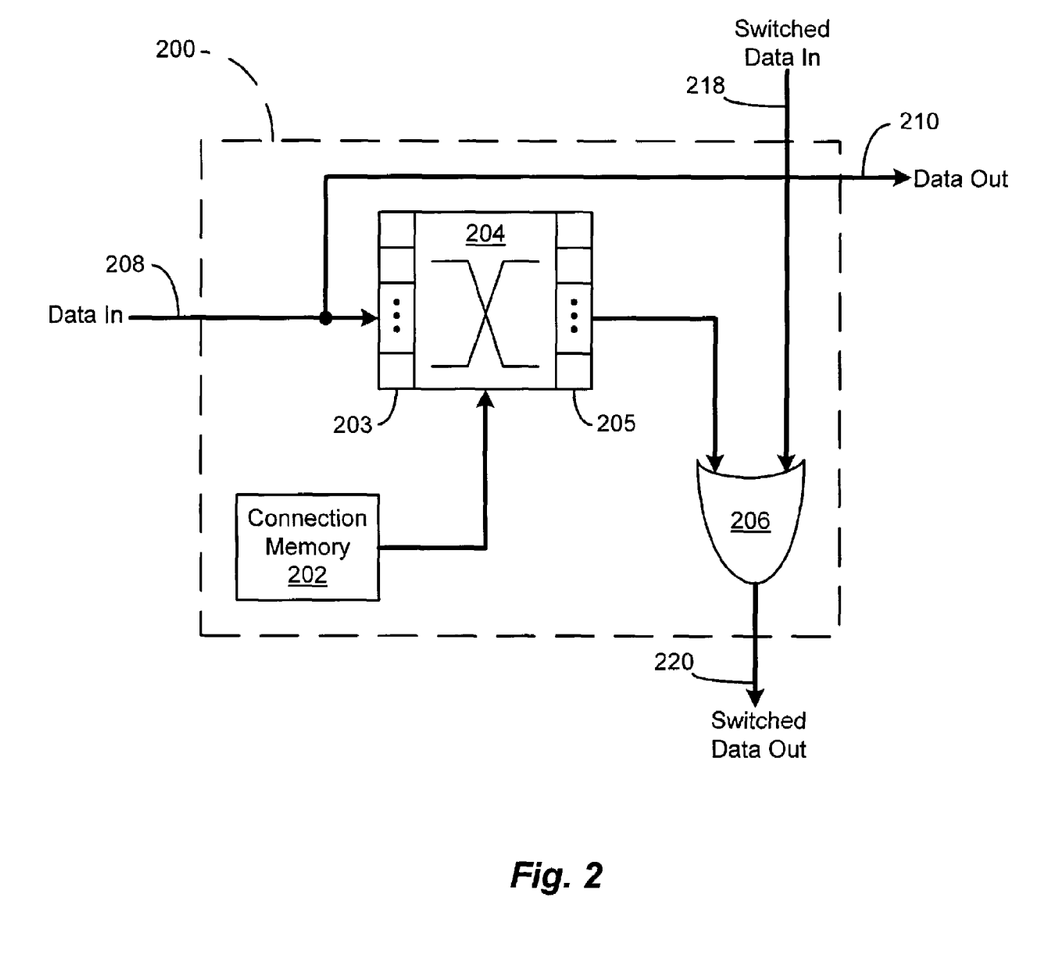
FIG. 2 is a block diagram of a first embodiment of a TDM cross-connect building block for a digital cross-connect switching system according to the present invention.

FIG. 2 depicts a first illustrative embodiment of a TDM cross-connect switching system 200, in accordance with the present invention. In the illustrated embodiment, the cross-connect switching system 200 includes a first input bus 208, a second input bus 218, a first output bus 210, and a second output bus 220. The cross-connect switching system 200 further includes a cross-connect 204 such as a TDM cross-connect including a plurality of input ports 203 and a plurality of output ports 205, a connection memory 202, and an OR gate 206. The TDM cross-connect 204 is configured to receive first optical and/or electrical input signals, e.g., DS-3, OC-3, OC-12, STS-1, STS-3, STS-NC, STS-M, and/or STM-1 data frames, from the input bus 208 at one or more of the respective input ports 203, and to provide the data to one or more of the respective output ports 205 based on connection information stored in the connection memory 202. The TDM cross-connect 204 provides the data at the output ports 205 to the OR gate 206 as first switched output data. The cross-connect switching system 200 further provides the first input data carried by the input bus 208 to the output bus 210 as first output data for subsequent transmission through the digital communications system.

As shown in FIG. 2, the OR gate 206 is configured to receive second optical and/or electrical input signals, e.g., data frames, as second switched input data from the input bus 218, and to provide the logical OR of the first switched output data (generated by the TDM cross-connect 204) and the second switched input data to the output bus 220 as second switched output data for subsequent transmission through the digital communications system. It is noted that the digital communications system comprising the cross-connect switching system 200 may include one or more broadband digital communications networks such as a Local Area Network (LAN), a Wide Area Network (WAN), the Internet, or any other suitable network.

In order to provide a scalable bandwidth digital cross-connect switching system, the cross-connect switching system 200 may be employed as a TDM cross-connect building block, and a plurality of such building blocks 200 may be operatively interconnected to meet the bandwidth requirements of the system.

Figure 3:
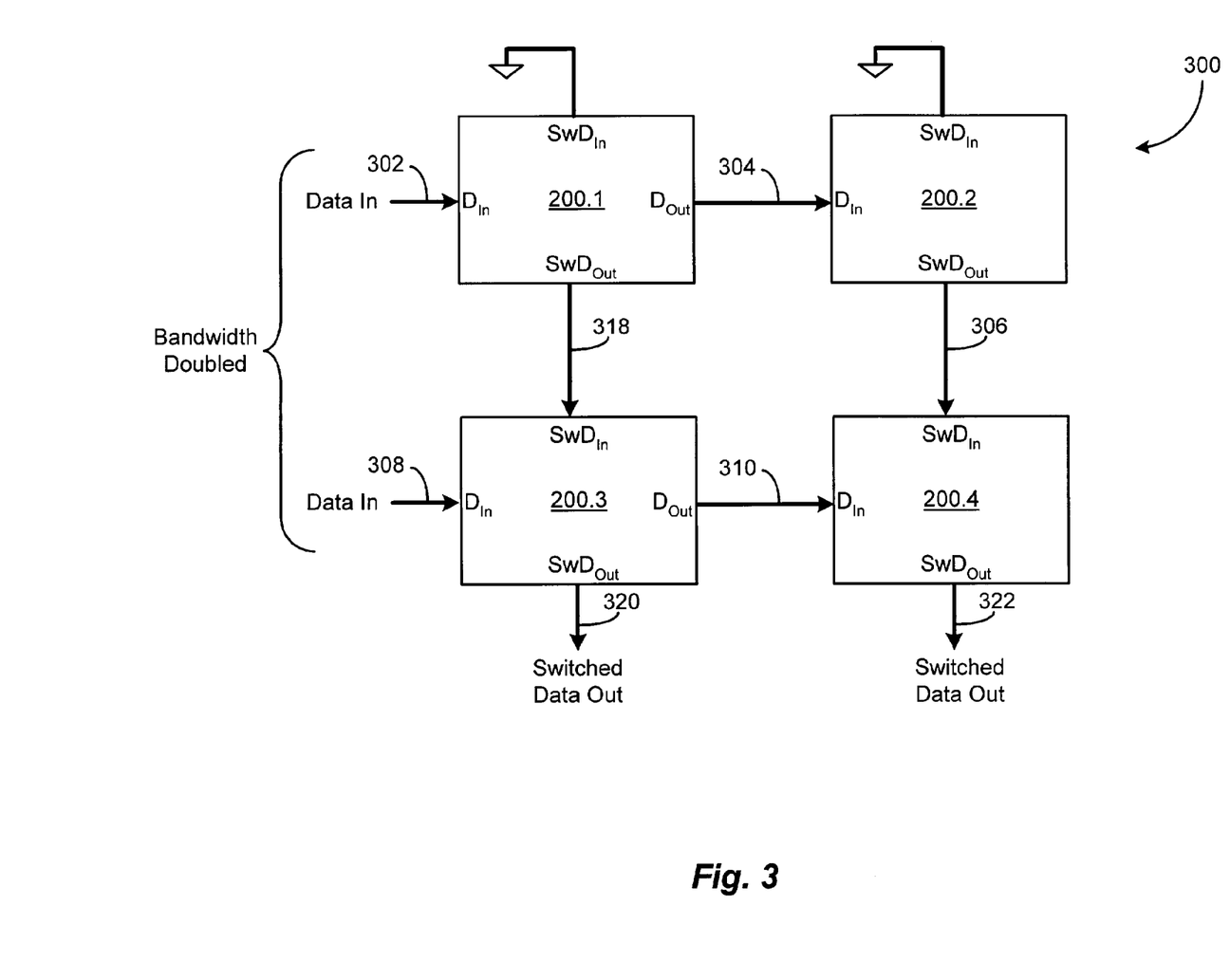
FIG. 3 is a block diagram depicting four of the TDM cross-connect building blocks of FIG. 2 operatively interconnected to double the bandwidth of the digital cross-connect switching system.
Figure 4:
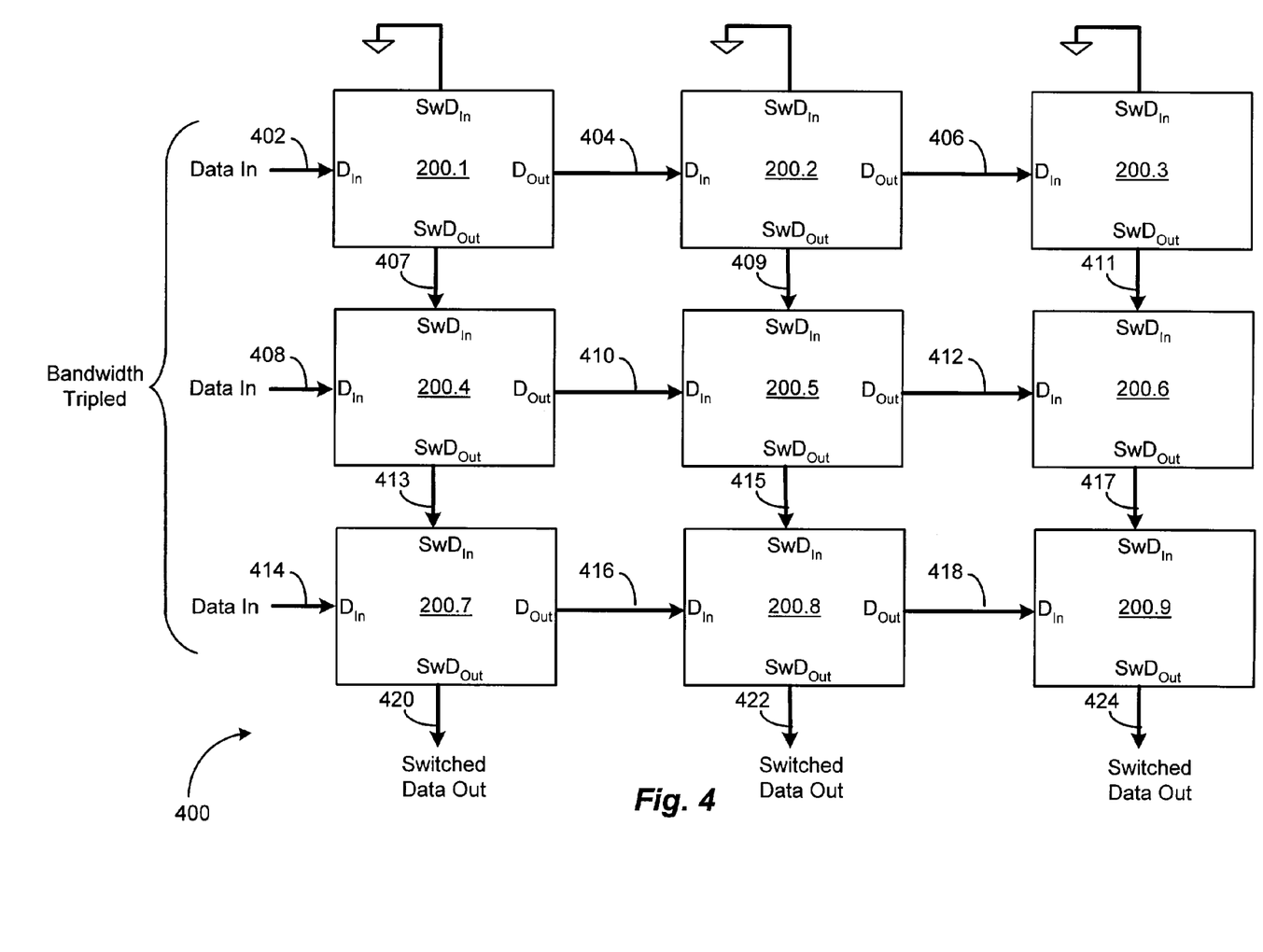
FIG. 4 is a block diagram depicting nine of the TDM cross-connect building blocks of FIG. 2 operatively interconnected to triple the bandwidth of the digital cross-connect switching system.

The presently disclosed scalable bandwidth digital cross-connect switching system will be better understood with reference to the following first and second illustrative examples and FIGS. 3-4. As shown in FIG. 3, four of the TDM cross-connect building blocks 200 are operatively interconnected to double the bandwidth of the digital cross-connect switching system. Specifically, a TDM cross-connect switching system 300 having double the bandwidth capacity of the TDM cross-connect switching system 200 (see FIG. 2) includes four TDM cross-connect building blocks 200.1-200.4 (see FIG. 3). Each of the TDM cross-connect building blocks 200.1-200.4 is like the TDM cross-connect switching system 200 of FIG. 2. For example, the TDM cross-connect building block 200.3 is coupled to an input bus 308 (see FIG. 3) that corresponds to the input bus 208 (see FIG. 2), an input bus 318 (see FIG. 3) that corresponds to the input bus 218 (see FIG. 2), an output bus 310 (see FIG. 3) that corresponds to the output bus 210 (see FIG. 2), and an output bus 320 (see FIG. 3) that corresponds to the output bus 220 (see FIG. 2). It is noted that in this first example, the Switched Data In ("$SwD_{In}$") inputs of the TDM cross-connect building blocks 200.1-200.2 are tied to ground potential.

Accordingly, the TDM cross-connect building block 200.1 receives input data from an input bus 302 at a Data In ("$D_{In}$") input, provides output data to the $D_{In}$ input of the TDM cross-connect building block 200.2 via a Data Out ("$D_{out}$") output and an output bus 304, and provides switched output data to the $SwD_{In}$ input of the TDM cross-connect building block 200.3 via a Switched Data Out ("$SwD_{out}$") output and an output bus 318. The TDM cross-connect building block 200.2 provides switched output data to the $SwD_{In}$ input of the TDM cross-connect building block 200.4 via a $SwD_{out}$ output and an output bus 306. The TDM cross-connect building block 200.3 receives input data from the input bus 308 at a $D_{In}$ input, provides output data to the $D_{In}$ input of the TDM cross-connect building block 200.4 via a $D_{out}$ output and the output bus 310, and provides switched output data to the output bus 320. Similarly, the TDM cross-connect building block 200.4 provides switched output data to an output bus 322.

As shown in FIG. 4, nine of the TDM cross-connect building blocks 200 are operatively interconnected to triple the bandwidth of the digital cross-connect switching system. Specifically, a TDM cross-connect switching system 400 having triple the bandwidth capacity of the TDM cross-connect switching system 200 (see FIG. 2) includes nine TDM cross-connect building blocks 200.1-200.9 (see FIG. 4). Each of the TDM cross-connect building blocks 200.1-200.9 is like the TDM cross-connect switching system 200 of FIG. 2. It is noted that the $SwD_{In}$ inputs of the TDM cross-connect building blocks 200.1-200.3 are tied to ground potential.

Accordingly, the TDM cross-connect building block 200.1 receives input data from an input bus 402 at a $D_{In}$ input, provides output data to the $D_{In}$ input of the TDM cross-connect building block 200.2 via a $D_{out}$ output and an output bus 404, and provides switched output data to the $SwD_{In}$ input of the TDM cross-connect building block 200.4 via a $SwD_{out}$ output and an output bus 407. The TDM cross-connect building block 200.2 provides output data to the $D_{In}$ input of the TDM cross-connect building block 200.3 via a $D_{out}$ output and an output bus 406, and switched output data to the $SwD_{In}$ input of the TDM cross-connect building block 200.5 via a $SwD_{out}$ output and an output bus 409. The TDM cross-connect building block 200.3 provides switched output data to the $SwD_{In}$ input of the TDM cross-connect building block 200.6 via a $SwD_{out}$ output and an output bus 411.

The TDM cross-connect building block 200.4 receives input data from an input bus 408 at a $D_{In}$ input, provides output data to the $D_{In}$ input of the TDM cross-connect building block 200.5 via a $D_{out}$ output and an output bus 410, and provides switched output data to the $SwD_{In}$ input of the TDM cross-connect building block 200.7 via a $SwD_{out}$ output and an output bus 413. The TDM cross-connect building block 200.5 provides output data to the $D_{In}$ input of the TDM cross-connect building block 200.6 via a $D_{out}$ output and an output bus 412, and switched output data to the $SwD_{In}$ input of the TDM cross-connect building block 200.8 via a $SwD_{out}$ output and an output bus 415. The TDM cross-connect building block 200.6 provides switched output data to the $SwD_{In}$ input of the TDM cross-connect building block 200.9 via a $SwD_{out}$ output and an output bus 417.

The TDM cross-connect building block 200.7 receives input data from an input bus 414 at a $D_{In}$ input, provides output data to the $D_{In}$ input of the TDM cross-connect building block 200.8 via a $D_{out}$ output and an output bus 416, and provides switched output data to an output bus 420. Similarly, the TDM cross-connect building block 200.8 provides output data to the $D_{In}$ input of the TDM cross-connect building block 200.9 via a $D_{out}$ output and an output bus 418, and switched output data to output bus 422. Further, the TDM cross-connect building block 200.9 provides switched output data to an output bus 424.

Figure 5:
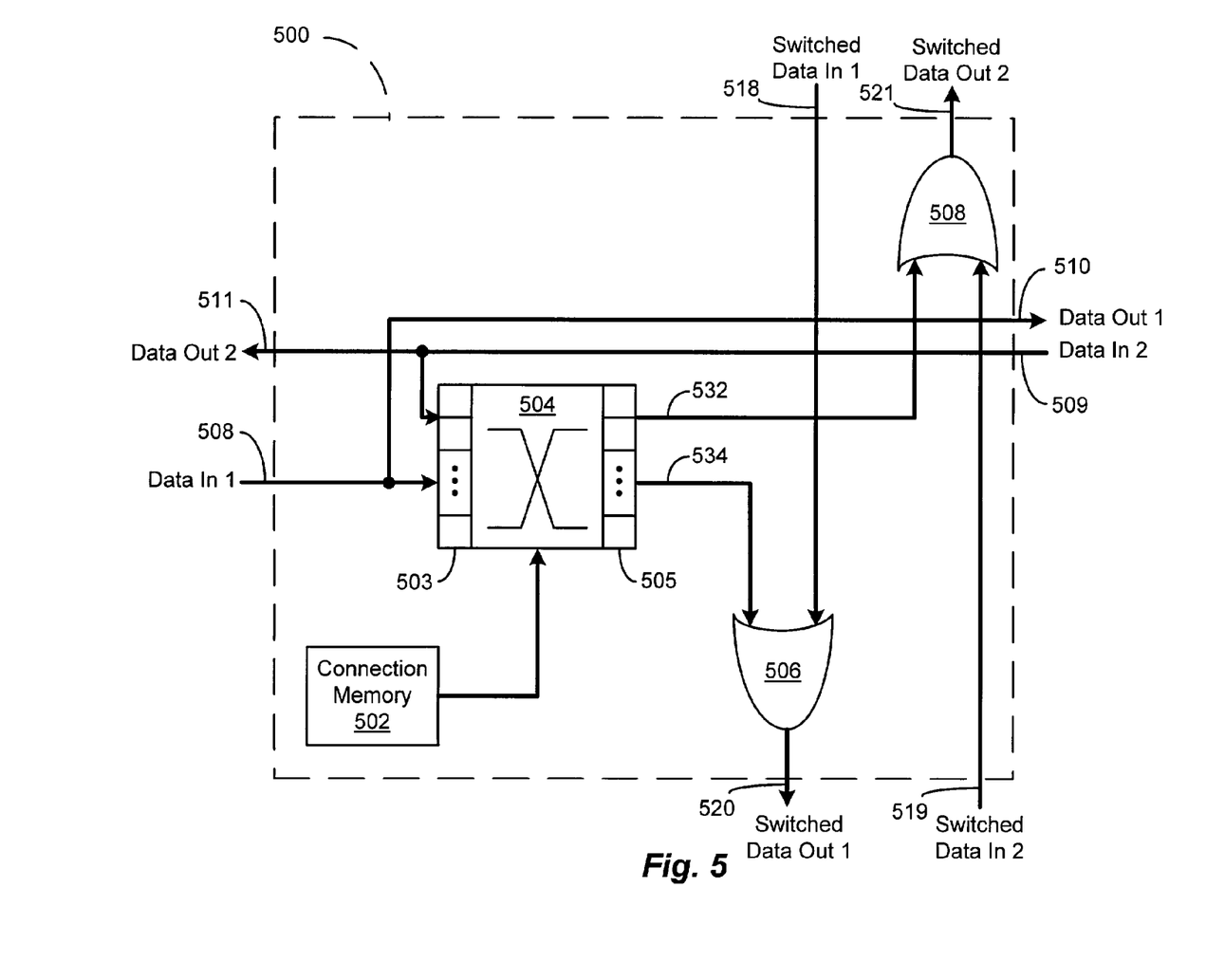
FIG. 5 is a block diagram of a second embodiment of a TDM cross-connect building block for a digital cross-connect switching system according to the present invention.

FIG. 5 depicts a second illustrative embodiment of a TDM cross-connect building block 500, in accordance with the present invention. In the illustrated embodiment, the cross-connect building block 500 includes a first input bus 508, a second input bus 509, a third input bus 518, a fourth input bus 519, a first output bus 510, a second output bus 511, a third output bus 520, and a fourth output bus 521. The cross-connect building block 500 further includes a cross-connect 504 such as a TDM cross-connect including a plurality of input ports 503 and a plurality of output ports 505, a connection memory 502, a first OR gate 506, and a second OR gate 508.

The TDM cross-connect 504 is configured to receive first input data ("Data In 1") from the input bus 508 at one or more of the respective input ports 503, and to provide the first data to one or more of the respective output ports 505 based on connection information stored in the connection memory 502. Similarly, the TDM cross-connect 504 is configured to receive second input data ("Data In 2") from the input bus 509 at one or more of the respective input ports 503, and to provide the second data to one or more of the respective output ports 505 based on connection information stored in the connection memory 502. The TDM cross-connect 504 provides the first data at the output ports 505 to the OR gate 506 as switched output data on a bus 534, and similarly provides the second data at the output ports 505 to the OR gate 508 as switched output data on a bus 532. The cross-connect switching system 500 further provides the first input data carried by the input bus 508 to the output bus 510 as first output data ("Data Out 1"), and provides the second input data carried by the input bus 509 to the output bus 511 as second output data ("Data Out 2"), for subsequent transmission through the digital communications system.

As shown in FIG. 5, the OR gate 506 is configured to receive first switched input data ("Switched Data In 1") from the input bus 518, and to provide the logical OR of the switched output data on the bus 534 and the Switched Data In 1 to the output bus 520 as first switched output data ("Switched Data Out 1"). Similarly, the OR gate 508 is configured to receive second switched input data ("Switched Data In 2") from the input bus 519, and to provide the logical OR of the switched output data on the bus 532 and the Switched Data In 2 to the output bus 521 as second switched output data ("Switched Data Out 2") for subsequent transmission through the digital communications system.

Figure 6:
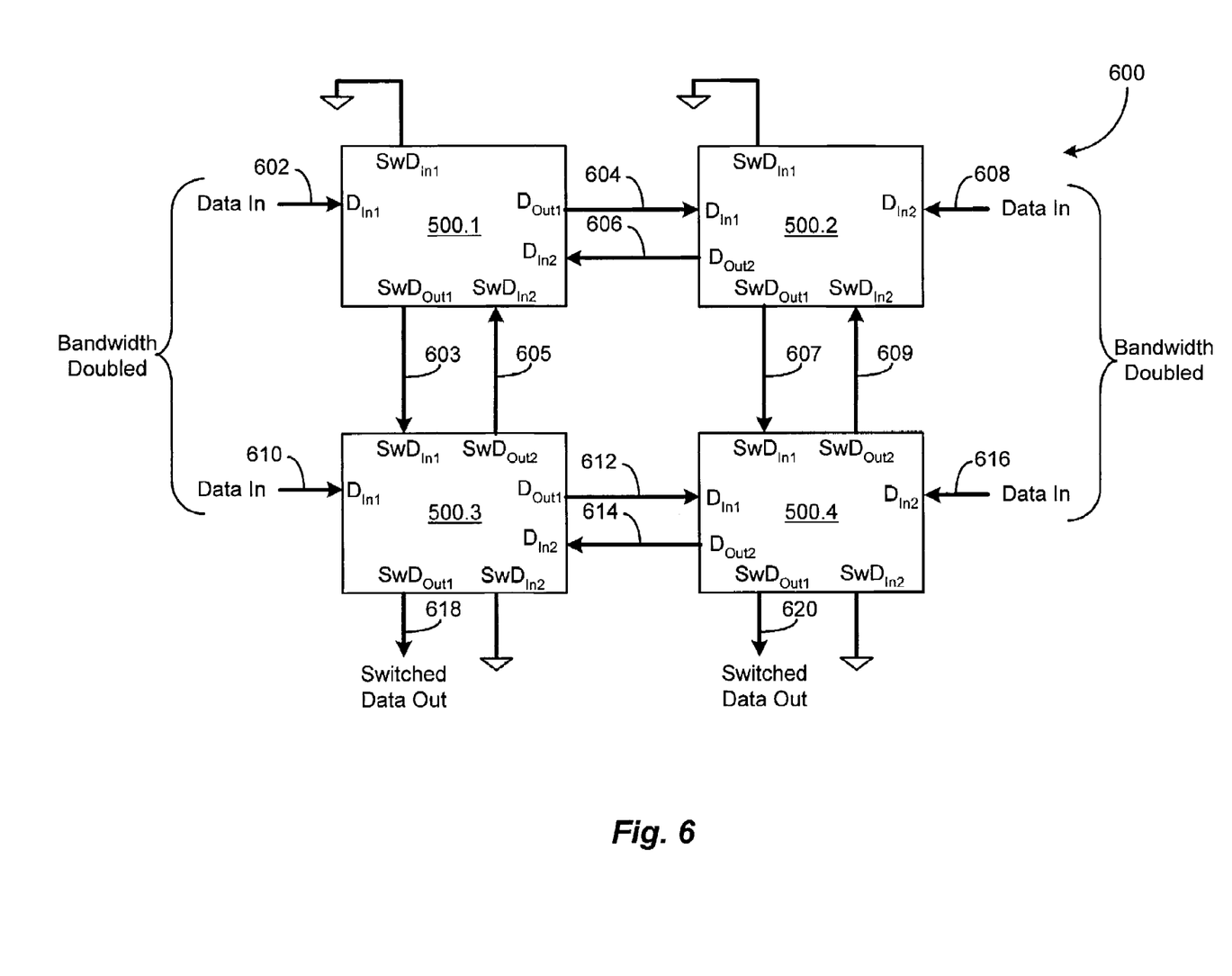
FIG. 6 is a block diagram depicting four of the TDM cross-connect building blocks of FIG. 5 operatively interconnected to double the bandwidth of the digital cross-connect switching system.

The presently disclosed scalable bandwidth digital cross-connect switching system will be better understood with reference to the following third illustrative example and FIG. 6. As shown in FIG. 6, four of the TDM cross-connect building blocks 500 are operatively interconnected to double the bandwidth of the digital cross-connect switching system. Specifically, a TDM cross-connect switching system 600 having double the bandwidth capacity of the TDM cross-connect switching system 500 (see FIG. 5) includes four TDM cross-connect building blocks 500.1-500.4 (see FIG. 6). Each of the TDM cross-connect building blocks 500.1-500.4 is like the TDM cross-connect switching system 500 of FIG. 5. It is noted that in this third example, the $SwD_{In1}$ inputs of the TDM cross-connect building blocks 500.1-500.2, the $D_{In2}$ inputs of the TDM cross-connect building blocks 500.2 and 500.4, and the $SwD_{In2}$ inputs of the TDM cross-connect building blocks 500.3 and 500.4 are tied to ground potential.

Accordingly, the TDM cross-connect building block 500.1 receives input data from an input bus 602 at the $D_{In1}$ input, receives input data from an input bus 606 at the $D_{In2}$ input, receives input data from an input bus 605 at the $SwD_{In2}$ input, provides output data to the $D_{In1}$ input of the TDM cross-connect building block 500.2 via the $D_{out1}$ output and an output bus 604, and provides switched output data to the $SwD_{In1}$ input of the TDM cross-connect building block 500.3 via the $SwD_{out}$ output and an output bus 603. The TDM cross-connect building block 500.2 receives input data from an input bus 608 at the $D_{In2}$ input, receives input data from an input bus 609 at the $SwD_{In2}$ input, and provides switched output data to the $SwD_{In1}$ input of the TDM cross-connect building block 500.4 via the $SwD_{out1}$ output and an output bus 607. The TDM cross-connect building block 500.3 receives input data from an input bus 610 at the $D_{In1}$ input, receives input data from an input bus 614 at the $D_{In2}$ input, provides output data to the $D_{In1}$ input of the TDM cross-connect building block 500.4 via the $D_{out1}$ output and an output bus 612, and provides switched output data to an output bus 618. Similarly, the TDM cross-connect building block 500.4 receives input data from an input bus 616 at the $D_{In2}$ input, and provides switched output data to an output bus 620.

It is understood that the conventional TDM cross-connect switching system 100 (see FIG. 1) may be employed as a TDM cross-connect building block, and a plurality of such building blocks may be operatively interconnected to meet the bandwidth requirements of the system. For example, a TDM cross-connect switching system 700 having double the bandwidth capacity of the conventional TDM cross-connect switching system 100 (see FIG. 1) includes four TDM cross-connect building blocks 100.1-100.4 (see FIG. 7). Each of the TDM cross-connect building blocks 100.1-100.4 is like the TDM cross-connect switching system 100 of FIG. 1.

Figure 7:
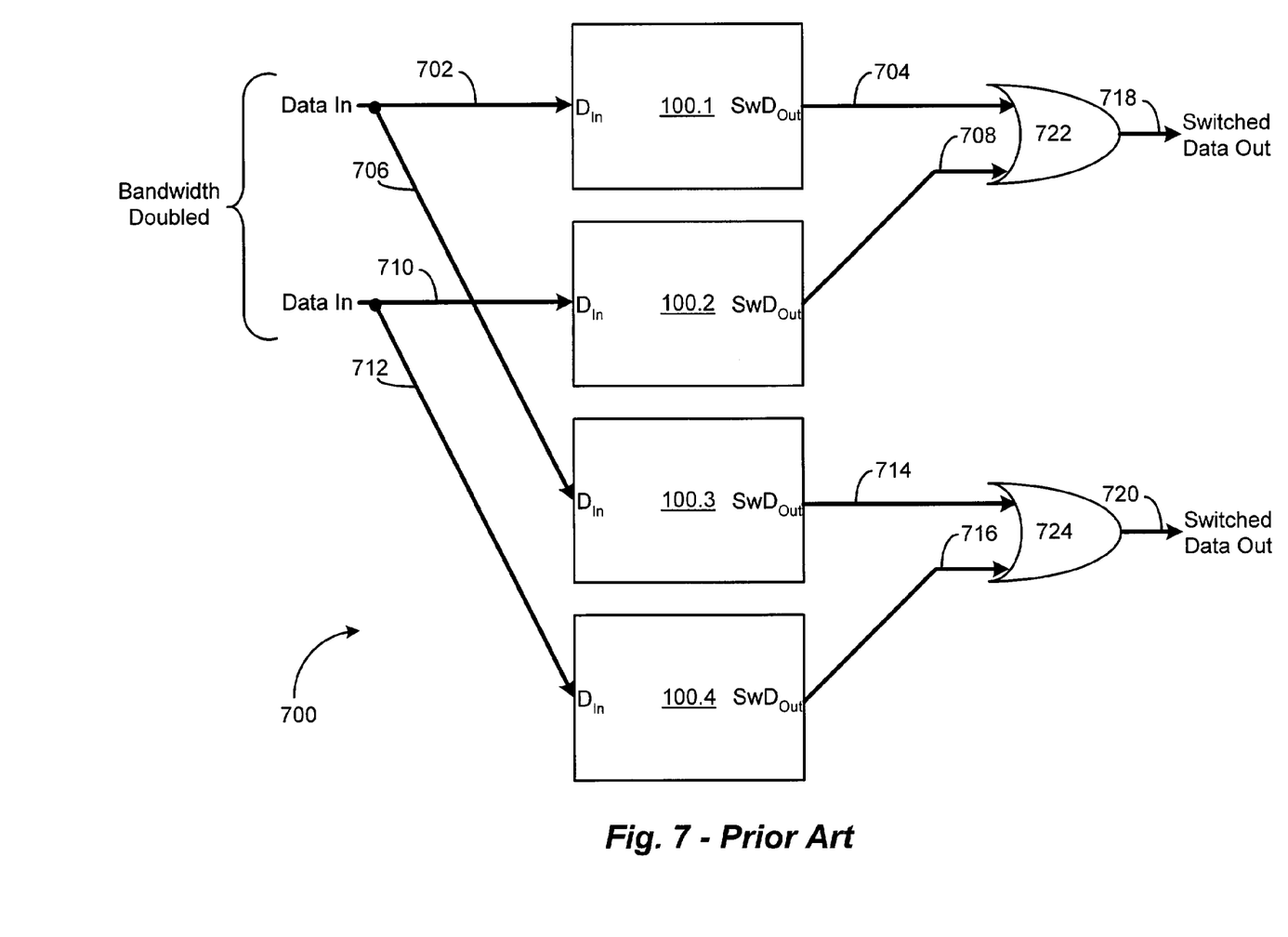
FIG. 7 is a block diagram depicting four of the conventional digital cross-connects of FIG. 1 operatively interconnected to double the bandwidth of a digital cross-connect switching system.

Accordingly, the TDM cross-connect building block 100.1 receives input data from an input bus 702 at the $D_{In}$ input, and provides switched output data to an OR gate 722 via the $SwD_{out}$ output and an output bus 704. The TDM cross-connect building block 100.2 receives input data from an input bus 710 at the $D_{In}$ input, and provides switched output data to the OR gate 722 via the $SwD_{out}$ output and an output bus 708. The TDM cross-connect building block 100.3 receives input data from an input bus 706 (which is coupled to the input bus 702) at the $D_{In}$ input, and provides switched output data to an OR gate 724 via the $SwD_{out}$ output and an output bus 714. The TDM cross-connect building block 100.4 receives input data from an input bus 712 (which is coupled to the input bus 710) at the $D_{In}$ input, and provides switched output data to the OR gate 724 via the $SwD_{out}$ output and an output bus 716. The OR gates 722 and 724 provide switched output data to respective output buses 718 and 720.

Figure 8:
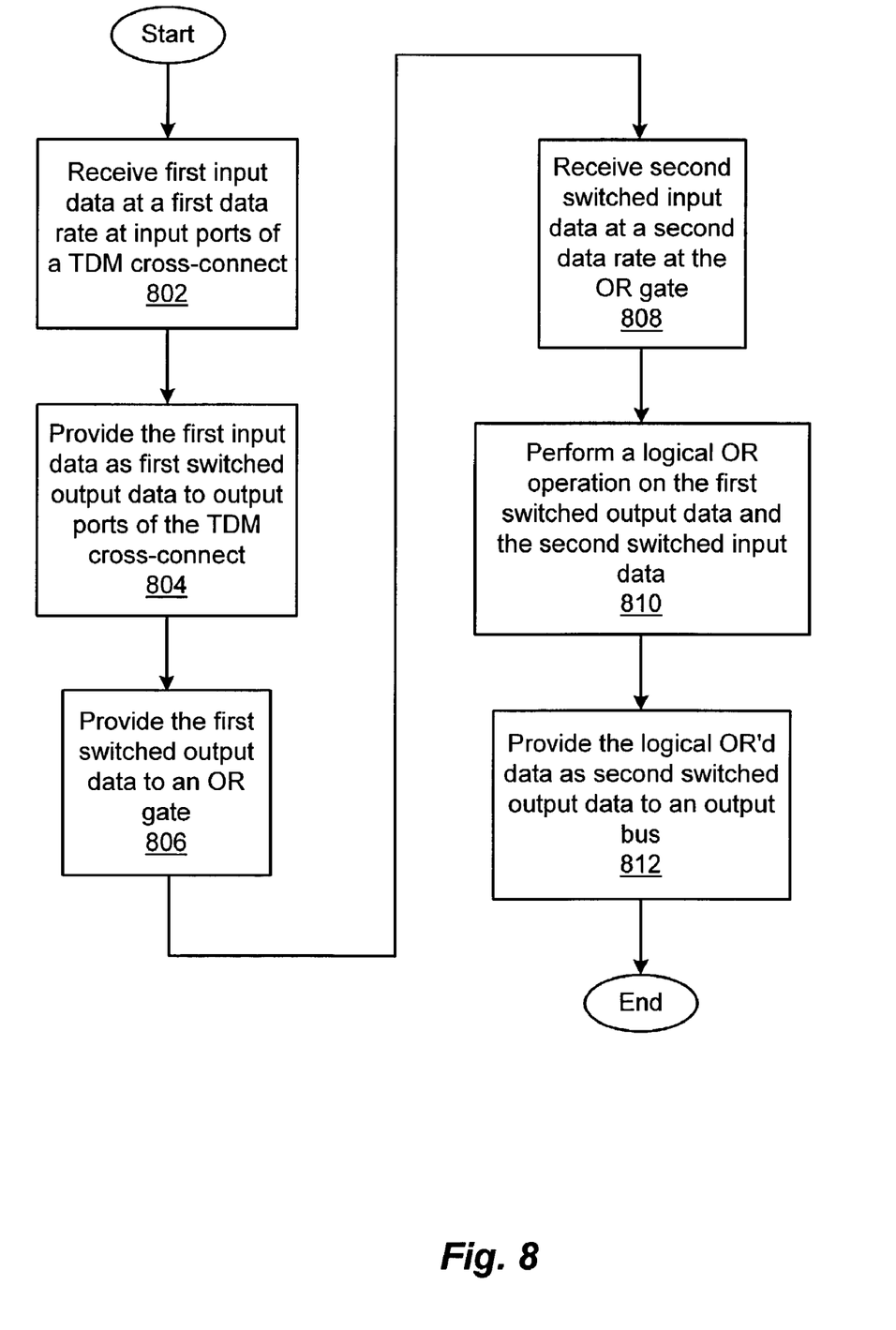
FIG. 8 is a flow diagram depicting a method of operating the TDM cross-connect building block of FIG. 2.

A method of operating the presently disclosed TDM cross-connect switching system is illustrated by reference to FIG. 8. As depicted in step 802, first input data having a first data rate is received at one or more input ports of a TDM cross-connect from an input bus. Next, the first input data is provided, as depicted in step 804, as first switched output data to one or more output ports of the TDM cross-connect based on connection information accessed from a connection memory. The first switched output data is then provided, as depicted in step 806, to an OR gate. Next, second switched input data having a second data rate is received, as depicted in step 808, at the OR gate. The OR gate then performs, as depicted in step 810, a logical OR operation on the first switched output data and the second switched input data, and provides, as depicted in step 812, the logical OR'd data as second switched output data to an output bus for subsequent transmission through the digital communications system.

It will further be appreciated by those of ordinary skill in the art that modifications to and variations of the above-described technique for building a large single-stage cross-connect using multiple devices without interleaving may be made without departing from the inventive concepts disclosed herein. Accordingly, the invention should not be viewed as limited except as by the scope and spirit of the appended claims.

What is claimed is:

1. A Time Division Multiplexing (TDM) cross-connect switching system, comprising:
at least one TDM cross-connect switching unit, the TDM cross-connect switching unit including at least one first input operative to receive first input data, at least one second input operative to receive second switched input data, at least one first output operative to provide first output data corresponding to the first input data, and at least one second output operative to provide second switched output data, the TDM cross-connect switching unit further including at least one connection memory configured to store predetermined connection information, a TDM cross-connect configured to receive the first input data and to generate first switched output data based on the predetermined connection information stored in the connection memory, and at least one OR gate configured to receive the second switched input data and the first switched output data, and to generate the second switched output data,
wherein the first output of the TDM cross-connect switching unit is connectable to the first input of a conceptually adjacent TDM cross-connect switching unit, and the second output of the TDM cross-connect switching unit is connectable to the second input of a conceptually adjacent TDM cross-connect switching unit.

2. The system of claim 1 wherein the first input is operative to receive the first input data at a first data rate, and the second input is operative to receive the second switched input data at a second data rate.

3. The system of claim 2 wherein the first data rate equals the second data rate.

4. The system of claim 1 including a plurality of the TDM cross-connect switching units operatively interconnected to increase a bandwidth capacity of the system.

5. The system of claim 4 including a plurality of $X^2$ TDM cross-connect switching units operatively interconnected to increase the bandwidth capacity of the system by a factor of X, wherein X is a positive integer value.

6. A method of operating a Time Division Multiplexing (TDM) cross-connect switching system, comprising the steps of:

in a first receiving step, receiving first input data from a first input bus by a TDM cross-connect at a first input included in a TDM cross-connect switching unit;

generating first switched output data based on predetermined connection information stored in a connection memory included in the TDM cross-connect switching unit by the TDM cross-connect;

in a first providing step, providing the first switched output data to an OR gate included in the TDM cross-connect switching unit by the TDM cross-connect;

in a second receiving step, receiving second switched input data from a second input bus by the OR gate at a second input included in the TDM cross-connect switching unit;

performing a logical OR operation on the first switched output data and the second switched input data to generate second switched output data by the OR gate;

in a second providing step, providing the first input data to a first output bus at a first output included in the TDM cross-connect switching unit;

in a third providing step, providing the second switched output data to a second output bus by the OR gate at a second output included in the TDM cross-connect switching unit; and in an interconnecting step, operatively interconnecting a plurality of TDM cross-connect switching units to increase a bandwidth capacity of the system, wherein the first output of the TDM cross-connect switching unit is connectable to the first input of a conceptually adjacent TDM cross-connect switching unit, and the second output of the TDM cross-connect switching unit is connectable to the second input of a conceptually adjacent TDM cross-connect switching unit.

7. The method of claim 6 wherein the first receiving step includes receiving the first input data at a first data rate from the first input bus by the TDM cross-connect, and wherein the second receiving step includes receiving the second switched input data at a second data rate from the second input bus by the OR gate.

8. The method of claim 7 wherein the first receiving step includes receiving the first input data at the first data rate, and wherein the second receiving step includes receiving the second switched input data at the second data rate, the first data rate being equal to the second data rate.

9. The method of claim 6 wherein the interconnecting step includes operatively interconnecting $X^2$ TDM cross-connect switching units to increase the bandwidth capacity of the system by a factor of X, X being a positive integer value.

* * * * *